Aug. 22, 1944.  A. LENTZ  2,356,600
PUSHER MECHANISM FOR TRACTORS
Filed May 16, 1941  2 Sheets-Sheet 1
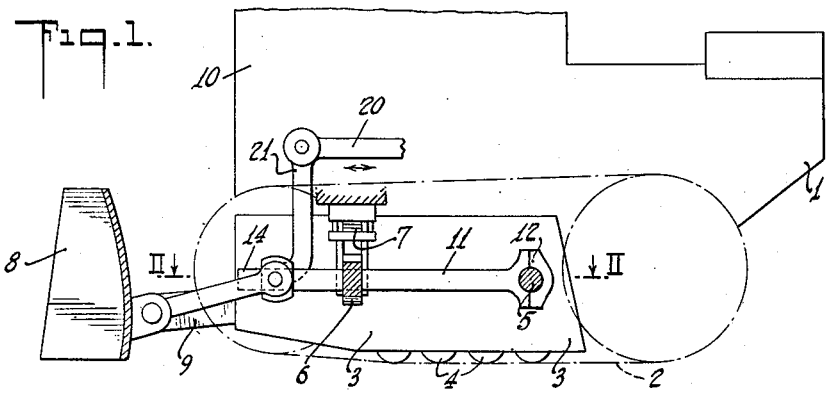
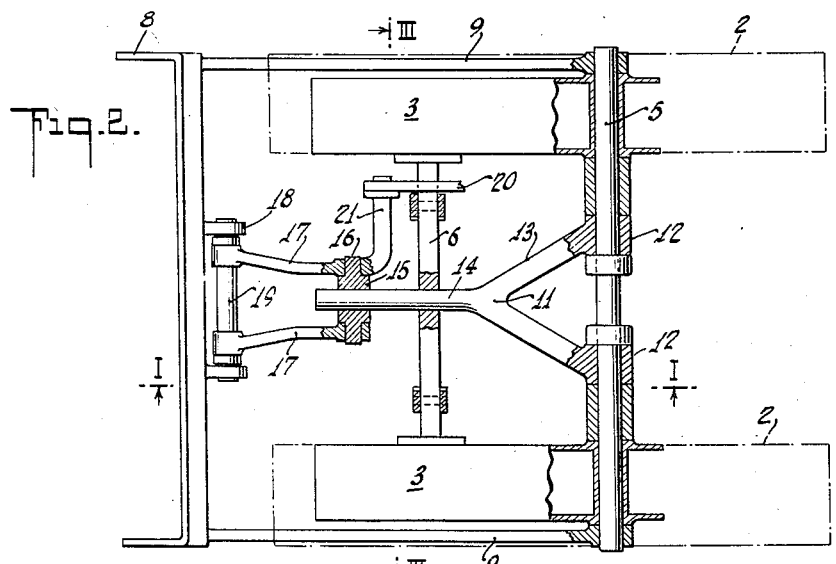
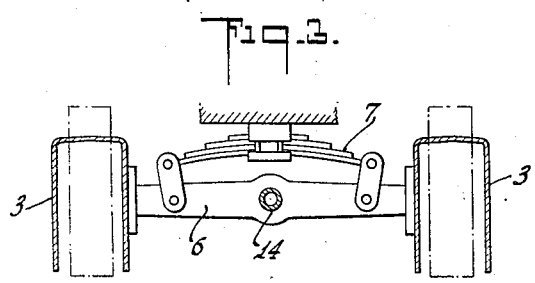
INVENTOR
ANTON LENTZ.
BY
ATTORNEY Aug. 22, 1944.   A. LENTZ   2,356,600
PUSHER MECHANISM FOR TRACTORS
Filed May 16, 1941   2 Sheets-Sheet 2

INVENTOR
ANTON LENTZ.
BY Karl A. Mayr
ATTORNEY

Patented Aug. 22, 1944

2,356,600

UNITED STATES PATENT OFFICE 2,356,600

PUSHER MECHANISM FOR TRACTORS

Anton Lentz, Heidelberg, Germany; vested in the Alien Property Custodian

Application May 16, 1941, Serial No. 393,715
In Germany February 29, 1940

13 Claims. (Cl. 37—144)

The present invention relates to a supplementary coupling or pushing mechanism for a bulldozer or a planer or like implement, which is connected by means of swing arms with a tractor particularly of the crawler type having chain tracks and which is supplementarily connected with said tractor by means of said coupling mechanism.

An object of the present invention resides in the provision of means for connecting the implement with the tractor in such a manner that forces acting on the implement cannot act on the forward portion of the body of the tractor and that the position of the implement is not influenced by resilient movements of the tractor body. Although the coupling members of the mechanism according to the invention are light, simple and can be manufactured inexpensively, the coupling mechanism gives greatest assurance against torsion of the implement relatively to the tractor.

The conventional systems for connecting a bulldozer or planer with a tractor can be used only in connection with tractors the body of which is not resiliently supported on the undercarriage and cannot be used in connection with spring supported tractor bodies because in such case the implement pushed by the tractor changes its position with respect to the ground whenever there is a resilient motion of the tractor body.

According to the present invention the implement is supplementarily connected with a support member disposed underneath the tractor body between the chain tracks and the support member is connected with one or a plurality of parts of the tractor. The support member is preferably arranged in the middle between the chain tracks and extends in the longitudinal direction of the tractor. The support axle and the swing axle for the chain tracks preferably serve for supporting said support member. The coupling mechanism according to the invention usefully fills the free space between the trailer and the swing axle. The support member according to the invention absorbs transverse forces and transmits these forces through the support axle to the rear and less sensitive part of the tractor body. With conventional support arrangements transverse forces are directly transmitted to the forward part of the tractor body and thereby to the engine or to the propelling mechanism. Resilient movements of the tractor body are without influence on the position of the implement pushed by the tractor because, with the mechanism according to the invention, the supplementary connection of the implement with the body of the tractor prevents lateral movements of the implement only and permits other relative movements.

The support member according to the invention consists of a preferably tubular carrier or beam which rests on the support axle and is guided in or on the swing axle and is longitudinally and rotatably movable thereto. With this arrangement a portion of the support member serves at the same time as swing axis for the swing axle.

The implement pushed by the tractor may be connected with the support member in various ways. The implement may, for example, depend from the support member and be connected therewith in the manner of a crosshead and be longitudinally displaceable with respect thereto. In this case the support member is provided with a forked end at which it is swingably connected with the support axle whereas the other end of the support member is rod like and extends through the swing axle and forms the swing axis thereof. A cross head is arranged at the end of the rodlike end portion of the support member and connected with the implement by means of levers. This kind of connection is particularly suitable for implements which must adapt themselves to unevenness of the ground and move relatively to the tractor when in operation. In case the implement is forced rectangularly or in a direction transversely with respect to the movement of the tractor the forces are transmitted by the connecting mechanism, according to the invention, through the levers and the cross head to the support member and therefrom to the support axle and to the swing axle without directly affecting the body of the tractor. Forces acting in the longitudinal direction of the vehicle are transmitted through the swing arms only, which in this case are rigidly connected with the implement, to the support axle; the same is the case with torsional forces because the implement can automatically adjust itself with respect to the tractor by turning about the longitudinal axis of the support member. Also in this case undesirable forces do not act on the tractor body itself. Lifting or lowering of the implement is effected by means of a conventional lifting and lowering mechanism and the operating gear thereof acts, according to the invention, on the levers. The implement is lifted or lowered by swinging the swing arms rigidly connected therewith about the support axle whereby the cross head with the levers connected thereto are longitudinally displaced on the support member.

In many cases it is not desirable that the implement can turn with respect to the vehicle and it is a further object of the present invention to provide a torsion resisting intermediary member for connecting the implement pushed by the tractor with the support member. This intermediary member is preferably provided with two forked ends so as to form an X shaped lever, one end of which is vertically swingably connected with the trailer and the other end of which is vertically swingably connected with a correspondingly shaped forked end of the support member. The latter may be built up of an individual forked end part connected with the intermediary member which end part is connected with the rod like end of the forward part of the support member after said rod like end has been pushed through the swing axle. In this embodiment of the invention the swing arms are movably connected with the trailer implement and form therewith and with the torsion resisting lever and with the support member a four cornered mechanism the corners of which are formed by movable joints. Torsion forces are absorbed by the swing arms and transmitted through the torsion resisting lever to the support member and to the support axle and to the swing axle. Since also all other undesirable effects are conducted through the swing arms and the connecting mechanism to the support axle and to the swing axle the implement itself as well as all connecting elements can be made comparatively light whereby the weight and the lifting forces are considerably reduced.

These and other important objects of the present invention will be apparent from the following specification and claims, and in the accompanying drawings wherein, by way of illustration, preferred embodiments of our invention are shown.

In the drawings:

Fig. 1 is a diagrammatic, vertical, longitudinal sectional view of a coupling or connecting mechanism according to the present invention, taken along line I—I of Fig. 2.

Fig. 2 is a diagrammatic, horizontal sectional view of the mechanism shown in Fig. 1 and taken along line II—II of said figure.

Fig. 3 is a cross sectional view of the mechanism shown in Figs. 1 and 2 and taken along line III—III of Figure 2.

Figure 4:
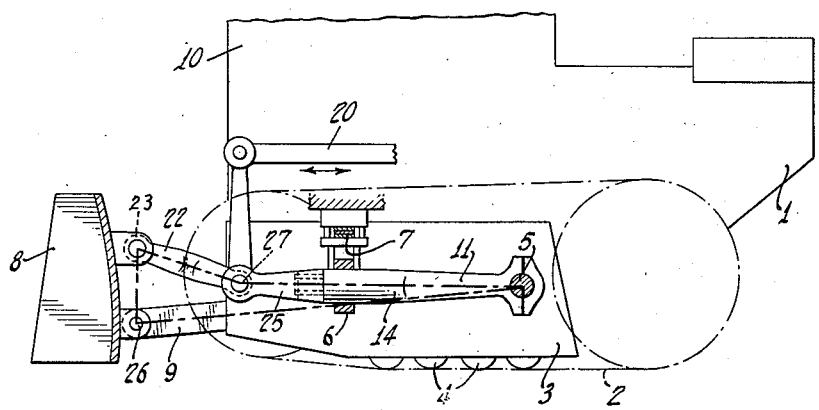
Fig. 4 is a diagrammatic, vertical sectional view of a modified coupling mechanism according to the present invention.

Referring more particularly to Figures 1 to 3, the motorized vehicle or crawler tractor 1 is provided with chain tracks 2 which are guided by rollers 4 journalled in frame 3 and which can adapt themselves to the configuration of the ground because of the arrangement of an axle 5 journalled in frame 3 and a swing axle 6. The latter is linked to springs 7 and supported by the roller frame 3. An implement, for example a planer 8, is connected with the tractor 1 by swing arms 9 which are journalled, for example, on the axle 5.

In the embodiment of the present invention shown in Figures 1 to 3 of the drawings the implement 8 is welded to the swing arms 9 and connected with a carrying element 11 which extends substantially along the longitudinal axis of the tractor between the chain tracks 2 and the tractor body 10. Element 11, which may be made of tubular material, has a forked rear end 13 provided with eyelet bearings 12 by means of which it is swingably connected with the axle 5. The rodlike portion 14 of element 11 extends forwardly movably through the swing axle 6 and forms the axis about which the axle 6 swings. A cross head like joint consisting of a bearing member 15 journalled on portion 14 of the element 11 and having horizontal pins 16 journalled in stay levers 17 which are swingably connected with implement 8, is arranged between portion 14 of the carrying element 11 and the implement 8. The latter is provided with ears 18 which revolvably support shaft 19 to which levers 17 are rigidly connected. Implement 8 may be raised and lowered by swinging it about axle 5. This is accomplished by means of conventional mechanism having an operating element 20 which is linked to an extension 21 of one of the stay levers 17. The frame formed by the implement 8 and arms 9 may be constructed more or less rigid according to the degree to which the implement is to follow the ground contour. In the event that the implement 8 is to move freely for this purpose it may move about the longitudinal axis of part 14 and adapt itself to transverse unevenness of the ground. In the raising or lowering of the implement the crosshead joint mechanism 15, 16 together with the stay levers 17 move in the longitudinal direction of the rod like portion 14 of the carrying element 11 in adjusting themselves to the swing motions. In the embodiment of the invention shown in the drawings shaft 5 is continuous. For assembly purposes collar rings located on the middle portion of the shaft may be placed thereon loosely, and fixed rigidly to the shaft after assembly.

Figure 5:
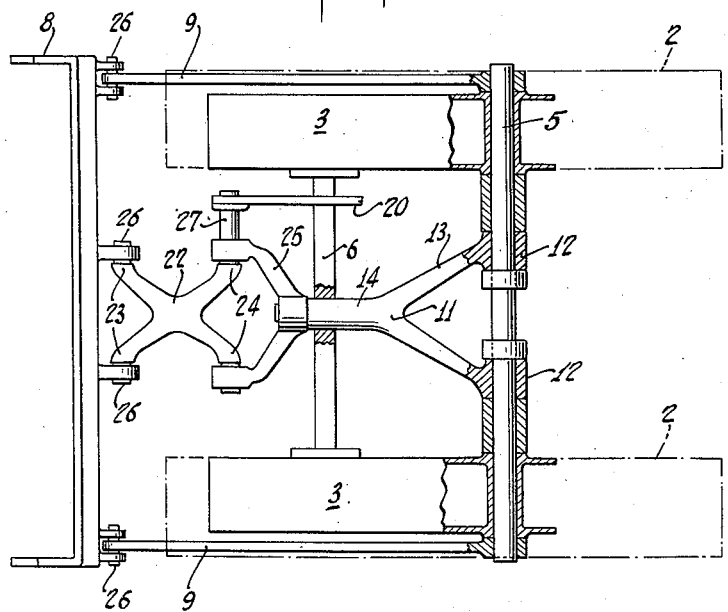
Fig. 5 is a horizontal sectional view of the coupling mechanism shown in Fig. 4.

In the embodiment illustrated in Figures 4 and 5 of the drawings the implement 8 is carried by the carrying element 11 by means of torsion resisting lever member 22. The latter is forked at both ends and has the configuration of an X. End portion 23 of member 22 is swingably connected with implement 8 and end portion 24 with forked end 25 of element 11; the swing joints permit movement only in a vertical plane in the direction of movement of the vehicle. Forked end 25 of the carrying element 11 is an individual element which is rigidly connected to rod like portion 14 after the latter has been pushed through the swing axle 6. In the present embodiment the front ends of the arms 9 are articulated to implement 8 by means of hinges 26. The hinges, together with the implement, the lever 22, and the carrying element 11, 25, form a four-cornered mechanism, the corners of which are constituted by joints. In this case implement 8 is connected with vehicle 1 absolutely stiff against torsion and can only adjust itself to unevenness of the ground by swinging in a vertical direction about axle 5. A rod 20 for lifting and lowering the implement is swingably connected with an extension 27 of a pin of the forked end 24 of lever 22.

While I have described preferred embodiments of my invention herein, I wish it to be understood that I do not desire to be limited to the exact details of design and construction shown and described, since obvious modifications will occur to a person skilled in the art.

What is claimed is:

1. In coupling means for supplementarily connecting an implement to be pushed by a chain track type of tractor wherein the tractor comprises a frame having a relatively fixed axle and a swing axle, with the chain tracks mounted on the axles; the combination of relatively rigid swing arms secured to said implement and pivoted to said fixed axle, a support element pivotally mounted on said fixed axle, said support element being movably connected to said swing axle, and connecting means movably connecting said support element with said implement.

2. In coupling means for supplementarily connecting an implement to be pushed by a chain track type of tractor wherein the tractor comprises a frame having a relatively fixed axle and a swing axle, with the chain tracks mounted on the axles; the combination of relatively rigid swing arms secured to said implement and pivoted to said fixed axle, a support element pivotally mounted on said fixed axle, said support element being movably connected to said swing axle, and connecting means movably connecting said support element with said implement, said connecting means providing for relative rotation and relative longitudinal movement between said swing axle and said implement.

3. In coupling means for supplementarily connecting an implement to be pushed by a chain track type of tractor wherein the tractor comprises a frame having a relatively fixed axle and a swing axle, with the chain tracks mounted on the axles; the combination of relatively rigid swing arms secured to said implement and pivoted to said fixed axle, a support element pivotally mounted on said fixed axle, said support element being movably connected to said swing axle, and connecting means movably connecting said support element with said implement, said support element comprising a tubular member disposed between the chain tracks.

4. In coupling means for supplementarily connecting an implement to be pushed by a chain track type of tractor wherein the tractor comprises a frame having a relatively fixed axle and a swing axle, with the chain tracks mounted on the axles; the combination of relatively rigid swing arms secured to said implement and pivoted to said fixed axle, a support element pivotally mounted on said fixed axles, said support element being movably connected to said swing axle, and connecting means movably connecting said support element with said implement, said support element having a forked end which is pivoted on said fixed axle and rod-like portion passing through an opening provided in said swing axle and constituting the swing axis of said swing axle.

5. In coupling means for supplementarily connecting an implement to be pushed by a chain track type of tractor wherein the tractor comprises a frame having a relatively fixed axle and a swing axle, with the chain tracks mounted on the axles; the combination of relatively rigid swing arms secured to said implement and pivoted to said fixed axle, a support element pivotally mounted on said fixed axle, said support element being movably connected to said swing axle, and connecting means movably connecting said support element with said implement, said support element having a forked end which is pivoted on said fixed axle and rod-like portion passing through an opening provided in said swing axle and constituting the swing axis of said swing axle, said connecting means comprising a crosshead mounted on said rod-like portion for rotation and longitudinal movement relative to said rod-like portion, said crosshead having pin means, and lever means swingably connected to said pin means and to said implement.

6. In coupling means for supplementarily connecting an implement to be pushed by a tractor of the chain track type; the combination of swing arms connected to and between the tractor and said implement, a support element longitudinally immovably connected with a rear part of the tractor and extending forwardly between the tracks thereof, lever means movably connected to and between said support element and said implement, and raising and lowering means rigidly connected to said lever means for elevating and depressing said implement relative to the tractor.

7. In the combination of a tractor, an implement such as a scraper blade, and means mounting the implement on the tractor, wherein the tractor comprises a rearwardly disposed relatively fixed axle and a forwardly disposed swing axle arranged to rise and fall and swing about a substantially horizontal axis which is longitudinal with respect to the tractor, in response to inequalities in the road surface and wherein said implement is arranged ahead of the swing axle; swing arms pivoted on the fixed axle and connected at their forward ends with the implement, a generally horizontal support element pivoted on said fixed axle and having a forepart extending forwardly beyond said swing axle, said forepart being movably connected with the middle of said swing axle in a manner to act as the pivot on which said swing axle tilts while connecting said support element to said swing axle for vertical movement with said swing axle, and connecting means connecting said forepart with said implement in a manner to permit said implement to rise and fall and to turn on the axis of said forepart relative to the tractor so as to follow irregularities of the road surface and respond to movements of said swing axle.

8. The combination recited by claim 7, wherein said connecting means comprises lever means horizontally pivoted at its forward end to said implement and horizontally pivoted at its rearward end to a portion of said connecting means which is turnable on said forepart of the support element.

9. In coupling means for supplementarily connecting an implement to be pushed by a tractor of the chain track type; the combination of vertically swingable arms connected between the implement and the tractor and pivoted on the latter, a longitudinal vertically swingable support element pivoted on the tractor between the tracks thereof, and connecting means mounted on said support element and connected to said implement, said connecting means being movable along and around said support element and including a horizontally pivoted connection with said implement.

10. In coupling means for supplementarily connecting an implement to be pushed by a tractor of the chain track type; the combination of vertically swingable arms connected to the tractor and to the implement, a longitudinal vertically movable support element connected with the tractor and disposed between the tracks thereof and having a forked rear end, and connecting means comprising a forked element rotatably mounted on said support element, a member forked at both ends and having the arms of one fork horizontally pivoted to the arms of said forked element, said connecting means having arms of its other forked end horizontally pivoted to the implement.

11. In coupling means for supplementarily connecting an implement to be pushed by a tractor of the chain track type; the combination of vertically swingable arms connected with the tractor, a support element horizontally pivoted at laterally spaced points on the tractor and disposed between the tracks thereof, and connecting means turnably supported on the axis of said support element and horizontally pivoted at laterally spaced points to said implement, said implement, said swing arms, said support element, and said connecting means constituting a four cornered mechanism the corners of which are constituted by the pivoted joints.

12. In the combination of a tractor, an implement such as a scraper blade, and means for mounting the implement on the tractor in a manner permitting said implement to follow an uneven surface without transmitting the resultant torsional stresses to the end of the tractor at which the implement is supported, relatively rigid arms connected with the implement and pivoted to the tractor, a support element, means horizontally pivoting a rear part of said support element to a relatively rearward part of the tractor in a manner precluding both longitudinal and lateral movement of said support element relative to the tractor, and connecting means connecting said implement with a forward part of said support element, said connecting means being axially rotatably mounted on a forward part of said support element and having horizontal pivoted connection with the implement.

13. In the combination of a tractor, an implement such as a scraper blade, and means for mounting the implement on the tractor to permit its adjustment; relatively rigid arms connected with the implement and pivoted to a rear part of the tractor, a support element, means horizontally pivoting a rear part of said support element to a rear part of the tractor in a manner precluding both longitudinal and lateral movement of said support element relative to the tractor, connecting means mounted on a forward part of said support element for rotation and longitudinal movement thereon and a forward part of said connecting means horizontally pivoted to the implement in a manner precluding lateral movement of said implement relative to the tractor.

ANTON LENTZ.